E. POHL.
X-RAY APPARATUS.
APPLICATION FILED MAR. 27, 1914.
1,233,122.
Patented July 10, 1917.
4 SHEETS—SHEET 3.
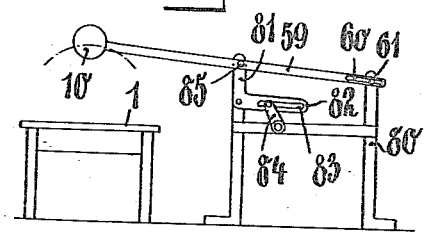
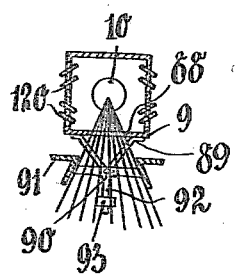 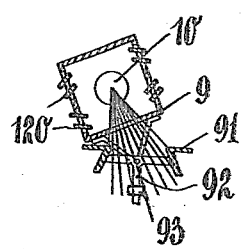
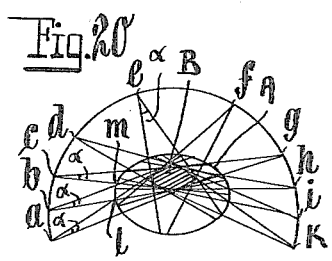
Witnesses:—
E. Pohl.
Inventor.
By G. Croydon Marks
Attorney.

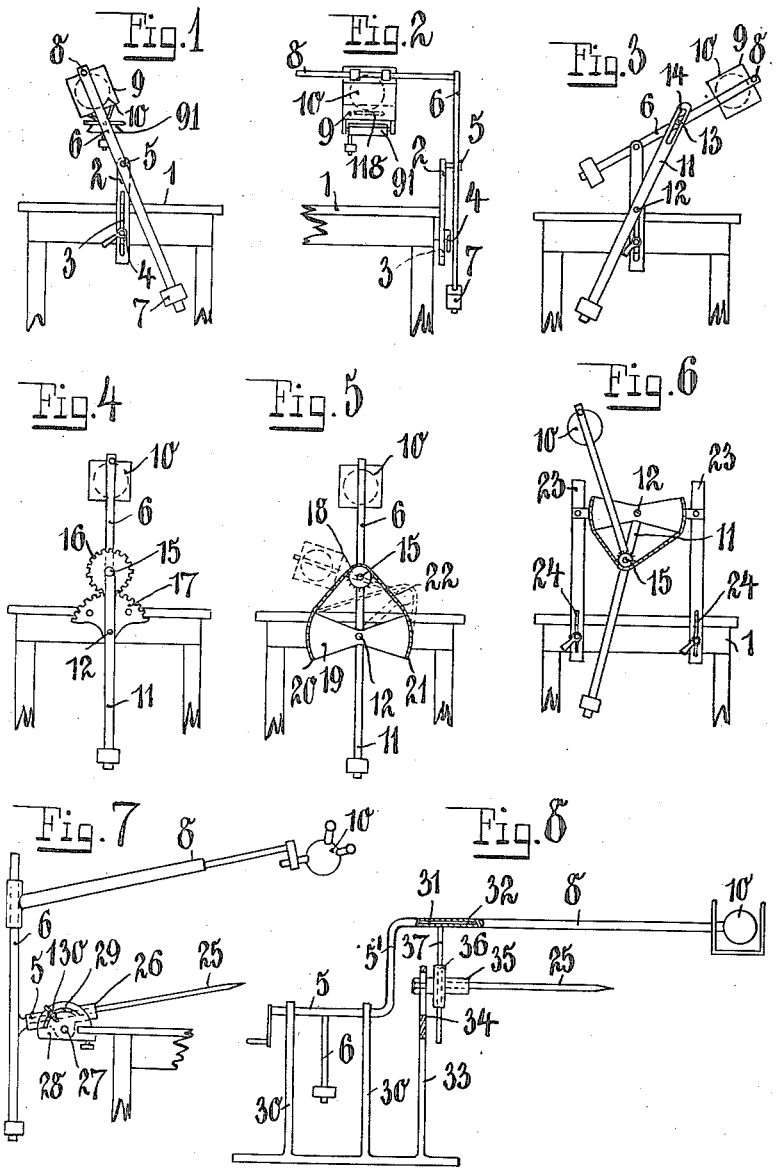

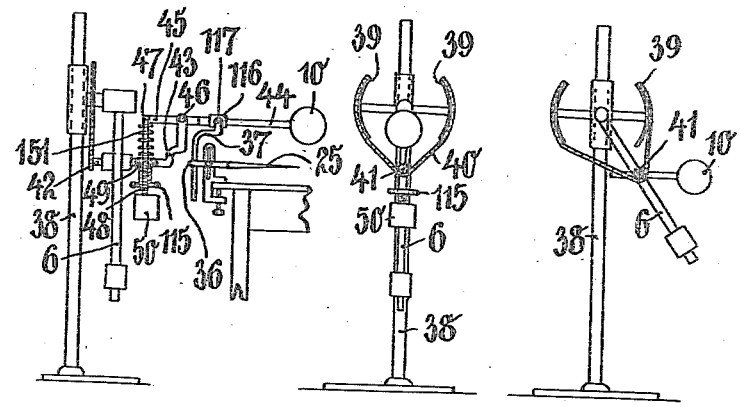
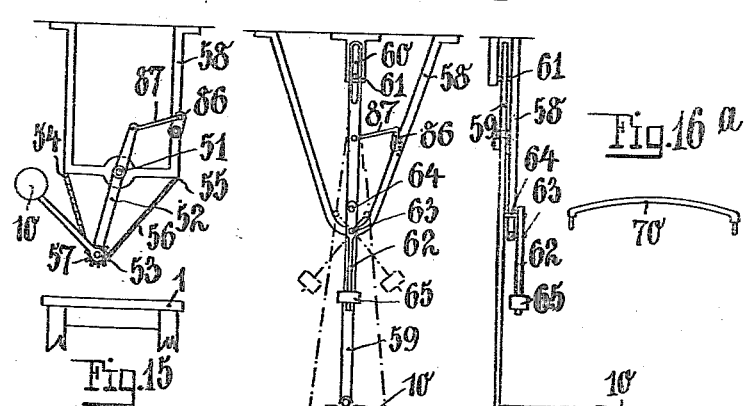

E. POHL.
X-RAY APPARATUS.
APPLICATION FILED MAR. 27, 1914.

1,233,122.

Patented July 10, 1917.
4 SHEETS—SHEET 4.

Witnesses:—

E. Pohl.
Inventor.
By G. Croydon Marks
Attorney.

UNITED STATES PATENT OFFICE.

ERNST POHL, OF KIEL, GERMANY.

X-RAY APPARATUS.

1,233,122.  Specification of Letters Patent.  Patented July 10, 1917.

Application filed March 27, 1914. Serial No. 827,630.

*To all whom it may concern:*

Be it known that I, ERNST POHL, a subject of the Emperor of Germany, and residing at Kiel, Germany, have invented certain new and useful Improvements in X-Ray Apparatus, of which the following is a specification.

When treating portions of the human body, for instance cancer, with rays emanating from Röntgen tubes or other sources such as radium, mesothorium or the like, a protracted treatment is necessary on account of the large absorption by those parts of the body through which the rays have to pass. The result of this is severe external burning. In order to overcome this disadvantage it has already been proposed to employ several sources of rays directed from different points to act through diaphragms upon the parts to be treated in such a manner that the rays pass through the surface of the body at different points, whereby, although the total effect upon the diseased portion remains the same, the harmful effects at the individual points of entry of the rays on the body surface is correspondingly reduced.

The present invention renders it possible to obtain a much more favorable result with the employment of only one source of rays by a pendulating or circular relative movement between the stopped down source of rays and the body being employed, so that although the rays are always directed upon the parts to be treated, the point of entry of the rays through the body surface changes continually and the rays act no longer at a single or at a few determined points, but in a large number of surface points which unite to form a band.

The invention is illustrated in several forms of construction in the annexed drawings, in which the employment of a Röntgen tube has been assumed as the source of radiant energy.

Figures 1-17 illustrate various forms of construction with pendulating tubes,

Figs. 18 and 19 illustrate an adjustable shutter,

Fig. 20 shows an appertaining diagram of rays,

Figure 22:
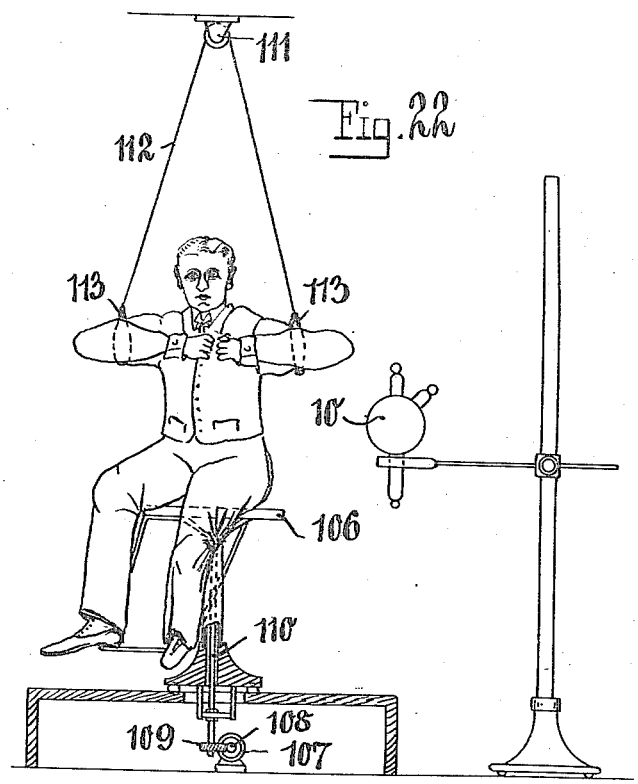

Fig. 22 with a rotary chair.

As shown in Figs 1 and 2, a support 2 is secured to the table 1 upon which lies the patient. Said support 2 is vertically adjustable by means of its longitudinal slot 3 through which passes the securing screw 4. On the support 2 is pivotally mounted a pendulum 6 having a weight 7, by means of a pivot 5. At the upper end the pendulum 6 carries a bar 8 parallel to the axis of the pivot 5. On this bar is secured in the longitudinal direction a casing 9 containing the Röntgen tube, said casing being provided with a slot diaphragm 118 in the wall directed toward the pendulum axis and parallel with same, for the passage of the rays and combined with a movable shutter 91 (Figs. 18 and 19) which coacts with the slot 118 to regulate the effective width of the diaphragm opening in dependence upon the position of the pendulum 6, as will be described.

When a patient is to be treated, the support 2 is adjusted vertically until the axis of the pendulum pivot 5 is in alinement with the point to be treated. Further, the tube 10 on the bar 8 is brought into the vertical plane of the pendulum axis passing through the point in question and secured so that the axis of the bundle of rays passing through the diaphragm is directed to that point, that is, that said bundle cuts the axis of the pivot 5. If the tube 10 is then caused to oscillate, the rays emanating from same are always directed upon the point to be treated.

The pendulum 6 can be caused to oscillate by gravity or by hand or by mechanical drive. In the latter two cases the weight 7 serves only as counterweight.

In the form of construction illustrated in Fig. 3, the pendulum 6 which carries the tube 10 is connected by means of a pin 13 with a pendulum 11 pivoted at 12, said pin 13 engaging in a slot 14 of the pendulum 11. In this construction the tube has a greater angle of oscillation than that of the driving pendulum 11, so that the effect of the rays is distributed over a greater portion of the body surface.

The construction according to Fig. 4 also effects a movement of the tube 10 about a greater angle than that corresponding to the oscillation of the pendulum 11. An arm 6 carrying the tube 10, and a toothed wheel 16 are mounted upon a pivot 15 at the upper end of the pendulum 11, said wheel 16 being in engagement with a stationary toothed segment 17 of large radius concentric with the pendulum axis 12. Consequently on the one hand an oscillation of the tube 10, which oscillation is comparatively large when compared with the radii of 16 and 17, corresponds to a determined oscillation of the pendulum 11 and on the other hand the tube in consequence of the pendulating movement of the point of rotation of its supporting arm 6 describes a substantially elliptical elongated curve, such that it moves at approximately constant distance from the surface of the body of the patient.

In the construction according to Fig. 5 a similar effect is attained by a chain wheel 18 being secured on the axis 15 at the upper end of the pendulum 11 which carries the arm 6 with the tube 10. Around this chain wheel is a chain 22 secured to a fixed double sector 19 at the points 20, 21. When the pendulum 11 oscillates, the wheel 18 rolls on the chain 22 and this latter is simultaneously drawn away from the circular surface of one side of the double sector 19, as indicated in dotted lines, so that the tube 10 executes a rotary movement around the axis 15. In consequence of the swinging movement of the pivot 15 a substantially elliptical movement results.

The arrangement shown in Fig. 6 differs essentially from that shown in Fig. 5 only in that the axis 15 is not mounted on an extension of the pendulum 11 above the axis 12, but on this pendulum itself. The curve thus described by the tube 10 is flatter than with the arrangement shown in Fig. 5, because the curve of the path of the pivot 15 is opposed to the curve of the path described by the tube 11 about this axis. The double sector is, according to this arrangement, raised and secured to two supports 23 secured adjustably to the table 1 by means of slots 24.

Fig. 7 illustrates a device in which, in the extension of the axis of the pendulum 6 which carries on an arm 8 the tube 10, an indicator 25 is arranged which serves for adjusting the direction of the rays emanating from the tube 10 to a determined point. The axis 5 of the pendulum is guided in a bearing 26 which may rock about a pivot 27 and be secured in any position by a bolt 130 engaging in a circular slot 29 in a plate 28. As the axis 5 does not form a right-angle with the pendulum 6, this latter swings in a cone-surface, but every point of the pendulum and of the tube 10 moves in a circle in a plane vertical to the axis 5.

In Fig. 8 means are shown for concentrating the rays emanating from the tube 10 upon a point which lies outside the axis 5 of the pendulum 6. The axis 5 which is carried by two supports 30 is cranked at $5^1$ and carries at its free end parallel to the axis 5 a reduced portion 31 over which engages the bar 8 carrying the tube 10, by means of a sleeve 32 adapted to rotate on 31. On another support 33 is arranged an indicator 25 adjustable vertically in a slot 34. Over this indicator passes a sleeve 35 which carries a guide 36 parallel to the indicator axis. In this guide there slides a spindle 37 secured to the sleeve 32 of the bar 8. If now the tube 10 is adjusted on the bar 8, so that the axis of the bundle of rays emanating from said tube is in the same plane with the spindle 37, then, because said spindle 37 passes through the axis of the indicator 25, the axis of the bundle of rays will pass at any position of the tube through the axis of the indicator, that is to say, that as the indicator is fixed, the axis of the rays will pass through that point of the swinging plane of the tube upon which the indicator is directed. By correspondingly adjusting the height of the indicator 25 according to the height of the point to be treated, the rays may be concentrated upon the desired point irrespective of the position of the axis of rotation of the pendulum and without adjusting this axis.

Figs. 9, 10 and 11 show a similar arrangement in which the pendulum 6 together with the tube 10 and the devices carrying this latter are supported by a standard 38, while the adjusting indicator 25 is secured to the table 1. On the standard 38 are secured two toothed segments 39 which carry a chain 40. A toothed wheel 41 mounted on the pendulum 6 engages with the chain, so that, as is the case with the devices shown in Figs. 4, 5, and 6, the tube 10 which is mounted on an arm 43 carried by the axis of rotation 42 by means of the bar 44, describes a larger oscillation than the pendulum, in a substantially elliptical path. Upon the arm 43 is mounted a lever 45 upon which the arm 44 is rotatably mounted as in Fig. 8. The lever 45 is rotatable about its point of support 46 and upon the arm 43 and carries at its rear end by means of a joint 47 a threaded spindle 48 which passes through a guide 49 on the axis 42 and upon the thread of which a hand-wheel 115 bearing against the guide 49 is screwed. By rotating the hand-wheel 115 the tube 10 can be adjusted at different distances from the axis. The counter-weight 50 which always moves in opposite direction to the tube 10, opposes the centrifugal force of the tube and its supporting bar 44 during oscillation.

Between the guide 49 and the joint 47 is arranged a spring 151 surrounding the spindle 48 which always holds the hand-wheel 115 against the guide 49. The pivot bearing at 46 renders it possible to adjust the tube at different distances from the axis by means of the hand-wheel 115, as above described. On the spindle 44 is further arranged a slidable sleeve 116, which, however, is unrotatable on said spindle, on the pivots 117 of which sleeve engages a guide bar 37 which goes through a guide 36 in the axis of the indicator 25 and thus controls the tube, so that the rays always pass through the axis of the indicator 25.

Fig. 12 illustrates a mechanism which is suspended by means of a ceiling bracket 58. On a lever 52 which oscillates about the axis 51 is arranged a chain wheel 53 which rolls along the chain 56 secured at 54 and 55. The device must be so arranged with respect to the table upon which the patient lies that the point to be treated, lies in the concentration area of the rays emanating from the tube. The movement of the lever 52 is derived from a crank 86 which acts by the intermediary of a connecting rod 87 upon the lever 52.

In Figs. 13 and 14 is likewise illustrated a device suspended by means of a ceiling bracket 58. The tube 10 is in this case arranged on a lever 59 which is guided by means of a slot 60 at its upper end on a pin 61 and whose movement is also derived from a crank 86 by the intermediary of a connecting rod 87. A further guiding of the lever 59 is effected by means of a guiding lever 62 which is pivotally mounted on the bracket 58 at 63 and which engages with its upper end with a pivot 64 secured to the lever 59. On the rotation of the crank 86, the lever 59 is moved alternately to the right and to the left and the point of attachment of the pivot 64 describes a circular movement about the pivot 63 of the guiding lever 62, while at the same time the slot 60 guided on the pin 61 permits of the necessary longitudinal movement caused by the movement of the pivot 64. The tube 10 at the lower end of the lever 59 thus describes a flat curve. At the lower end of the guiding lever 62 is arranged a counterweight which always oscillates in the opposite direction to the lever 59 thus counterbalancing the weights.

With this arrangement, if the tube were connected rigidly with the lever 59, the rays would not be concentrated upon one point, but the contrary would take place. It is therefore necessary, as in Figs. 8 and 9, to provide a special controlling device for the tube which is arranged movable with regard to the lever 59, which device is preferably connected in the illustrated manner with the table 1 upon which the patient lies.

The construction according to Fig. 15 corresponds substantially to Figs. 13 and 14, but instead of the guiding lever 62 a curved interchangeable guide 68 is employed, upon which runs a roller 67 mounted at 66 on the lever 59.

According to the arrangement shown in Fig. 16, the tube 10 is guided by an interchangeable guide path 70 carried by support 69. The tube is secured to the truck 71 provided with rollers 72, said truck being moved to and fro by means of a cord, chain or the like passing over guide rollers 74, 75, 76, 77. The truck is actuated by a crank 78 and a connecting rod 79.

While in Fig. 16 the guide path 70 is of half-circular shape, Fig. 16ª shows a flat curved guide path. The guide path may be of any suitable form to correspond to the movement which the tube 10 is intended to execute with relation to the body to be irradiated.

As shown in Fig. 17, the tube is secured to a lever 59 which extends from the side over the table upon which the patient lies. The lever 59 which is guided by means of a slot 60 on a pin 61 is connected by means of a pivot 85 with the one arm 81 of an angle lever upon whose other arm 82 there acts a crank 84 engaging with its pin in a slot 83. A swinging motion of the bell crank lever 81, 82 corresponds to a swinging or rotary motion of the crank 84, so that also the tube 10 situated on the lever 59 has a corresponding, but flatter curved motion. The whole device is in this case arranged on a frame 80 resting on the floor.

As a rule, the area to be irradiated is not of cylindrical but of flat form and when seen from the individual points of the path of movement of the tube, has different dimensions. According to the present invention, the bundle of rays emanating from the tube is as far as possible of such dimensions that it just suffices for irradiating the projection of the area offered to the tube, so that an irradiation of the neighboring area and of the body surface is obviated as far as possible. For this purpose it is necessary to correspondingly alter the width of the shutter opening during the motion of the tube.

In Fig. 20 are illustrated the proceedings when irradiating a body of approximately elliptical section. It is assumed that B represents the area to be irradiated within the body A and that the tube has a swinging movement on the curved line a—k. If the tube is in the position a, then there results the angle α corresponding to the width of the shutter opening, when both tangents are drawn from the point a to the body B. In the same way are obtained the shutter openings for all the remaining positions b, c, d, e, f, g, h, i and k. It is, however, not sufficient that for each position, the corresponding shutter opening is obtained but, in order to obtain an equal irradiation of the body surface, it is also necessary for the individual points of the surface to be irradiated for an equal period of time. This is obtained by the speed being adjusted in a corresponding proportion to the shutter opening at the individual sections of the path of the tube. The velocity for the individual points can be ascertained in the following manner. Starting from the point $a$, the outermost upper ray, when in this position, cuts the surface of the body A at the point $l$. If now a tangent is drawn through this point to the body B, then this tangent cuts the circular line at the point $b$. From this point, a second tangent is drawn to the body B which cuts the surface of the body A at the point $m$. The tangent passing through this point to the body B gives the point $c$. Continuing in this manner, the circular line is divided into sections corresponding to equal time periods, $i. e.$ the individual sections of the circular line give the dimension for the corresponding velocity, as said sections must be passed by the tube in equal periods of time in order to obtain a uniform irradiation of the individual parts of the outer surface of the body A.

With the assumed section of the area B to be irradiated, a simple pendular motion of the tube gives approximately the correct velocity conditions. An exact regulation of the velocity can of course be obtained by employing suitable mechanisms, for instance cranks, irregularly shaped gear - wheels, guides, or the like.

The likewise necessary adjustment of the shutter can be obtained from gearing or simply by the effect of gravity.

The shutters illustrated in Figs. 18 and 19 act in this manner. In the casing 9 which contains the tube 10 is provided a slot 88 which permits of the passage of a bundle of rays of a certain dimension. Below the casing is arranged a second shutter 91 pivoted at 90 on a suspension device 89, said shutter being provided with a pendulum 92 carrying a weight 93. If the pendulum carrying the tube 10 is in a vertical position, Fig. 18, then the shutter 91 lies in the axis of the bundle of rays emanating from the tube. Its opening width is such that in this position the whole of the rays passing through the opening 88 pass also through the shutter 91. If, however, the pendulum carrying the tube assumes a sloping position, Fig. 19, then the shutter 91 retains its vertical position under the influence of the weight 93. It therefore no longer lies in the axis of the bundle of rays emanating from the tube, but lies at an angle to same, so that a part of the rays are stopped down.

When mechanically controlling the shutter opening, it is preferable not to use a double shutter, but simply to alter the width of the opening 88 by relative movement of its edges.

It is known that the hardness of a tube is influenced to a substantial degree by the heat generated during operation. With the employment of an oscillating tube, a soft tube may be made harder by a quicker movement on account of the air-cooling caused thereby. On the other hand a harder tube may be made softer by a slow oscillatory movement on account of the greater heating caused thereby. In order to permit of a better action of the air on the tube inclosed in the casing, the casing may be provided with openings in the walls lying in the direction of movement, these walls being constructed, for instance, as louver windows, as shown in Figs. 18 and 19 to prevent the passage of rays.

Instead of causing the tube to oscillate, it may also be circulated around the body to be irradiated.

It is of course obvious that the arrangement may be reversed, namely, that the tube is fixed and the body to be irradiated describes an oscillating or circular movement with respect to the body. Devices of this kind are shown in Figs. 21 and 22.

Figure 21:
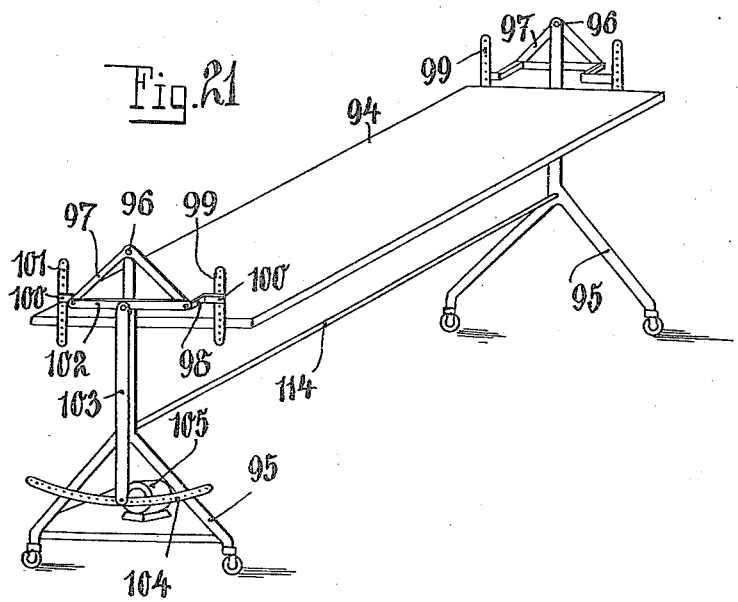
Fig. 21 illustrates an apparatus with pendulating table.

In the arrangement shown in Fig. 21, the table 94 upon which the patient lies executes an oscillating movement with respect to the tube assumed to be fixed. The supporting frame for the table consists of two end parts 95 connected by a bar 114. On the upper ends of said end parts 95 are arranged the pivots 96 for two suspended oscillating table carriers 97. On the table board 94 are secured suspension bars 99 which may be carried by pins 100 with inwardly directed arms 98 of the carriers 97. The bars 99 are provided with a row of holes 101, so that the table 94 can be adjusted vertically with respect to the axis of the pivot 96. From a cross-bar 102 of the one carrier 97 extends a pendulum 103 downward which carries at its lower end a rack segment or the like 104. An electromotor 105 causes an oscillating movement of the table 94 upon which the patient is secured, by means of a suitable intermediate gear or by periodically reversing its direction of rotation.

Fig. 22 illustrates a rotating chair 106 driven by an electromotor 107 by the intermediary of a worm-gear 108, 109, the worm-wheel 109 being secured on the axis of rotation 110 of the chair. A suspension device rotatably secured to the ceiling and which, as shown in the drawing, consists of a pivotally suspended roller 111 carrying supporting cords 112 with arm-bands 113, renders it possible to suspend the arms of the patient in such a manner that the arms do not hinder the passage of the rays passing from the tube 10 to the body.

Having now described my invention what I claim as new and desire to secure by Letters Patent is:—

1. Method for internal irradiation of the human body by rays of a suitable source, consisting in causing a relative oscillating or rotating movement between the stopped down source of radiant energy and the body, and concentrating said rays upon a determined point within said body, substantially as herein described.

2. Method for internal irradiation of the human body by rays of a suitable source, consisting in causing a relative oscillating or rotating movement between the stopped down source of radiant energy and the body, concentrating said rays upon a determined point within said body and adapting the shutter opening of the source of radiant energy at any point in the path of said source, to the projection of the portion to be irradiated, as set forth.

3. Method for internal irradiation of the human body by rays of a suitable source, consisting in causing a relative oscillating or rotating movement between the stopped down source of radiant energy and the body, concentrating said rays upon a determined point within said body, varying the shutter opening of the source of rays during movement and correspondingly varying the velocity of motion, substantially as described.

4. In an apparatus for the internal irradiation of the human body, the combination of a pendulum, a source of radiant energy mounted thereon, the axis of said pendulum being adjustable to aline with the portion to be irradiated for the purpose specified.

5. In an apparatus for the internal irradiation of the human body, the combination of a pendulum, a source of radiant energy, and a change speed mechanism for increasing the angle of oscillation of said source of rays, substantially as set forth.

6. In an apparatus for the internal irradiation of the human body, the combination of a pendulum, an arm, a source of radiant energy mounted thereon, said arm being rotatably mounted on said pendulum, and means to positively move said arm in dependence with the oscillations of said pendulum, substantially as described.

7. In an apparatus for the internal irradiation of the human body, the combination of a pendulum, an arm, a source of radiant energy mounted thereon, said arm being mounted with its point of rotation on said pendulum, a guiding member and a disk rolling thereon, as set forth.

8. In an apparatus for the internal irradiation of the human body, the combination of a pendulum, an arm, a source of radiant energy mounted thereon, said arm being mounted with its point of rotation on said pendulum, a guiding chain and a chain wheel rolling thereon.

9. In an apparatus for the internal irradiation of the human body, the combination of a pendulum, a source of radiant energy mounted thereon, the axis of said pendulum being adjustable to aline with the portion to be irradiated and a directing device for adjusting the axis of oscillation of the source of rays to the point to be irradiated, substantially as described.

10. In an apparatus for the internal irradiation of the human body, the combination of a pendulum, a source of radiant energy, a transmission mechanism for increasing the angle of oscillation of said source of rays and a directing device for adjusting the axis of oscillation of the source of rays to the point to be irradiated, substantially as described.

11. In an apparatus for the internal irradiation of the human body, the combination of a pendulum, an arm, a source of radiant energy mounted thereon, said arm being mounted with its point of rotation on said pendulum and a directing device for adjusting the axis of oscillation of the source of rays to the point to be irradiated, substantially as described.

12. In an apparatus for the internal irradiation of the human body, the combination of a pendulum, an arm, a source of radiant energy mounted thereon, said arm being mounted with its point of rotation on said pendulum, a guiding member, a disk rolling thereon and a directing device for adjusting the axis of oscillation of the source of rays to the point to be irradiated, substantially as described.

13. In an apparatus for the internal irradiation of the human body, the combination of a pendulum, an arm, a source of radiant energy mounted thereon, said arm being mounted with its point of rotation on said pendulum, a guiding chain, a chainwheel rolling thereon and a directing device for adjusting the axis of oscillation of the source of rays to the point to be irradiated, substantially as described.

14. In an apparatus for the internal irradiation of the human body, the combination of an oscillating pendulum, a source of radiant energy mounted thereon and a shutter whose opening width is adjustable upon the oscillatory movement, for the purpose specified.

15. In an apparatus for the internal irradiation of the human body, the combination of an oscillating pendulum, a source of radiant energy mounted thereon, a two-part shutter, one of said parts being disposed unalterable with respect to the source of rays, the other part being adjustable with respect to the first part under the influence of the oscillatory movement, substantially as set forth.

16. In an apparatus for the internal irradiation of the human body, the combination of an oscillating pendulum, a source of radiant energy mounted thereon, a two-part shutter, one of said parts being disposed unalterable with respect to the source of rays, the other part being adjustable with respect to the first part under the influence of gravity, substantially as set forth.

17. In an apparatus for the internal irradiation of the human body, the combination of a source of radiant energy, a shutter of variable opening width, and mechanism causing simultaneously an irregular motion of said source of rays and the variation in the opening of the shutter, for the purpose specified.

18. In an apparatus for the internal irradiation of the human body, the combination of oscillating mechanism, a source of radiant energy, a casing inclosing said source of rays, and air passages arranged in said casing on both sides in the direction of the oscillating movement.

19. In an apparatus for the internal irradiation of the human body, the combination of a source of radiant energy, a holder for same, a pendulum whose axis is out of line with the point of concentration of said rays and upon which said source of radiant energy is mounted, a directing device mounted on said holder for concentrating the rays on the same fixed point at all positions of the pendulum, said directing device being pivoted on an axis adjustable to aline with the point of concentration of said rays, for the purpose specified.

In testimony whereof I have signed my name to this specification in the presence of two subscribing witnesses.

ERNST POHL.

Witnesses:
 ALBRECHT MÜLLER,
 KARL FREDRICH FRENTZL.